United States Patent [19]

Thayer

[11] 4,005,823
[45] Feb. 1, 1977

[54] FLAP-TYPE TWO-DIMENSIONAL NOZZLE HAVING A PLUG

[75] Inventor: Edward B. Thayer, Hobe Sound, Fla.

[73] Assignee: United Technologies Corporation, Hartford, Conn.

[22] Filed: Sept. 30, 1975

[21] Appl. No.: 618,093

[52] U.S. Cl. .......................................... 239/265.37
[51] Int. Cl.² .......................................... B64C 9/38
[58] Field of Search ................ 239/265.19, 265.25, 239/265.27, 265.33, 265.35, 265.37, 265.39

[56] References Cited
UNITED STATES PATENTS

| | | | |
|---|---|---|---|
| 2,620,622 | 12/1952 | Lundberg | 239/265.37 |
| 2,838,909 | 6/1958 | Meulien | 239/265.27 X |
| 2,858,668 | 11/1958 | Kelley et al. | 239/265.37 |
| 2,880,575 | 4/1959 | Scialla | 239/265.37 |
| 3,596,836 | 8/1971 | Denning et al. | 239/265.33 X |
| 3,774,868 | 11/1973 | Goetz | 239/265.19 X |

Primary Examiner—John J. Love
Attorney, Agent, or Firm—Jack N. McCarthy

[57] ABSTRACT

A flap-type, two-dimensional nozzle having a plug for use with thrust creating vehicles which operate at both subsonic and supersonic speeds includes a rectangular exhaust with a balanced flap system at the top and the bottom thereof with a plug positioned therebetween, said plug being movable in whole or in part to obtain desired thrust capabilities including thrust vector control. The upper and lower flap systems can be controlled individually or together in order to achieve their desired objective.

9 Claims, 5 Drawing Figures

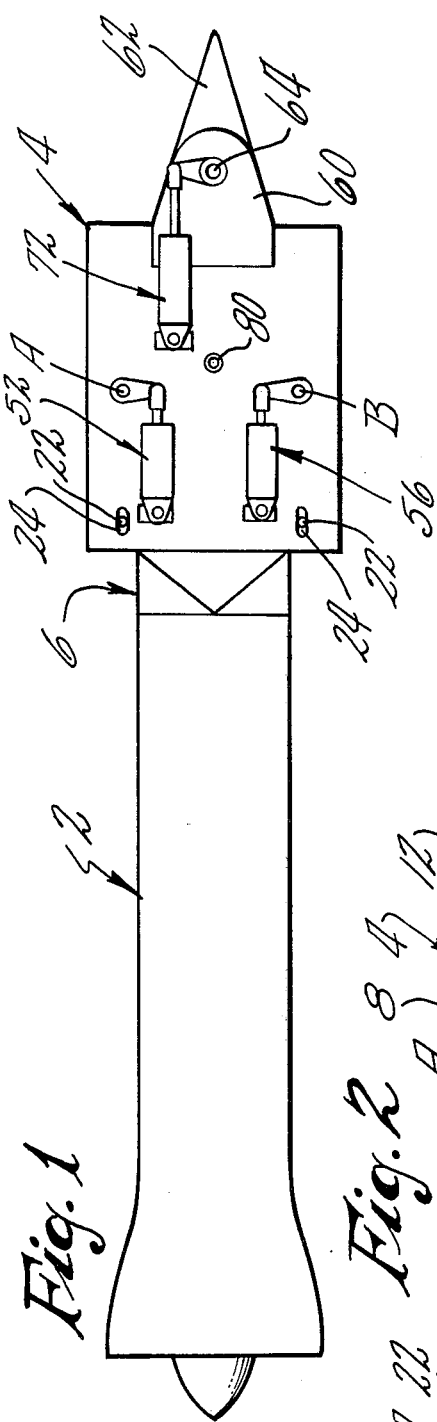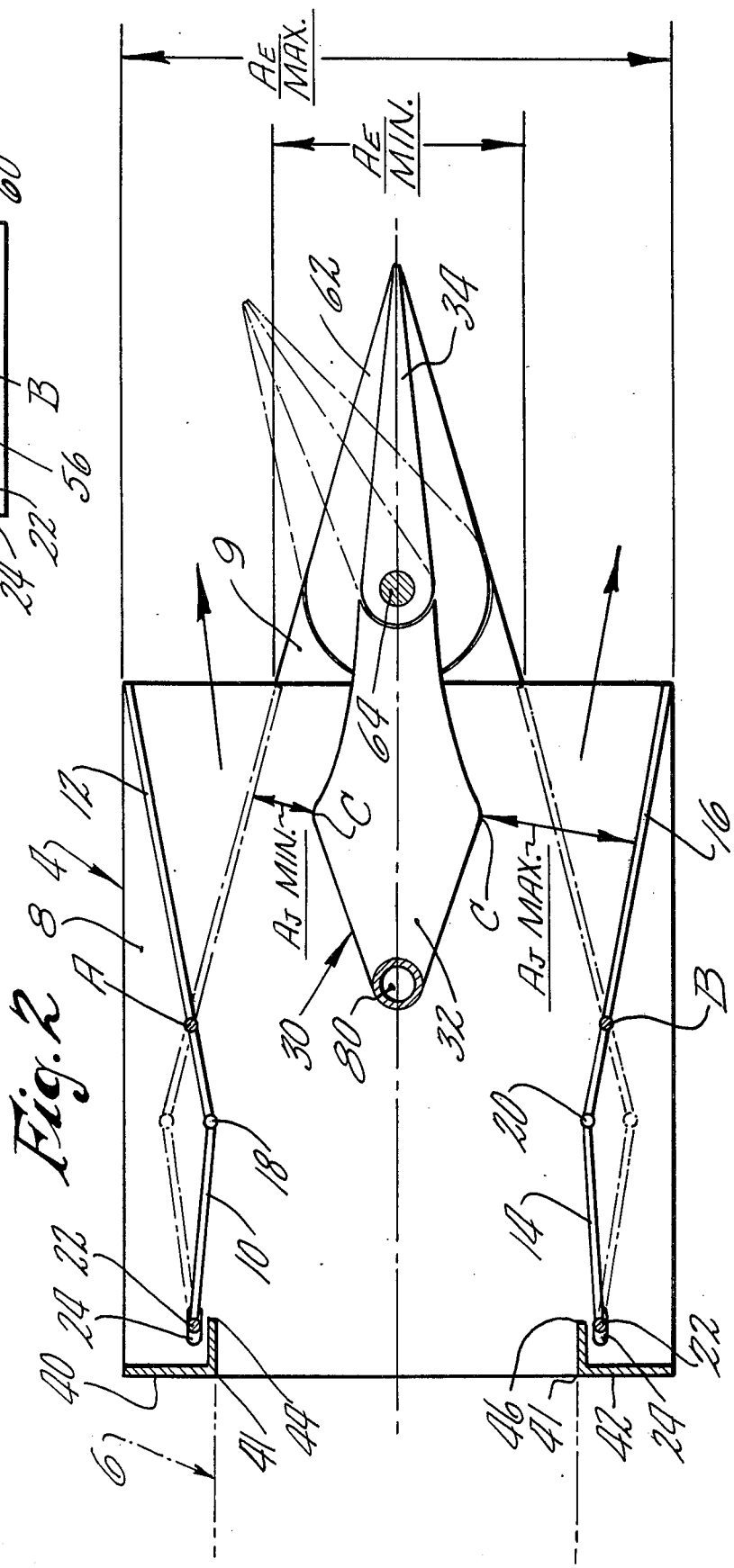
Fig. 1
Fig. 2

FLAP-TYPE TWO-DIMENSIONAL NOZZLE HAVING A PLUG

CROSS-REFERENCE TO RELATED APPLICATIONS

This application relates to subject matter disclosed in an application filed on even date by Edward A. Huenniger et al entitled "Two Dimensional Nozzle with Rotating Plug".

BACKGROUND OF THE INVENTION

In the prior art, two-dimensional exhaust nozzles having a plug generally use collapsing plugs to provide the increase in throat cross-sectional area required during afterburning operation, however, in such an exhaust nozzle arrangement the throat-to-exit area ratio decreases as throat area increases.

This invention relates to variable area exhaust nozzles for use with thrust generating engines and more particularly to such exhaust nozzles which are intended for use with high performance thrust generating engines. A two-dimensional nozzle having upper and lower flaps and a plug is shown in U.S. Pat. No. 3,040,523.

SUMMARY OF THE INVENTION

A primary object of the present invention is to provide an improved two-dimensional plug nozzle that incorporates a simple, non-expandable plug to accelerate and expand engine exhaust gases and a dual balanced flap system to control nozzle throat area.

It is the further object of this invention to provide a means of thrust vectoring by rotation of the non-expandable plug about its upstream end in conjunction with actuation of the balanced flap system to maintain constant throat area.

It is the further object of this invention to provide thrust vectoring by rotating the downstream end of the non-expandable plug, thereby making the vectoring system independent of the balanced flap throat area control system.

It is the further object of this invention to schedule the flap system such that nozzle area ratio remains constant or increases, rather than decreases, as throat area is changed from minimum to maximum.

It is a further object of this invention to provide a balanced flap system to minimize flap actuation forces, thereby reducing the weight of the nozzle structure and actuation system.

It is a further object of this invention to minimize the number of moving parts required to control throat area, schedule area ratio and vector thrust.

In accordance with the present invention, the flap systems can be rotated until they touch both sides of the plug, thereby blocking all flow through the nozzle.

It is a further object of the present invention that the side walls can be used for housing flap actuation systems and for supplying cooling air to the plug.

It is still a further object of the present invention that the ratio of the distance between the side walls and the distance between top and bottom flaps, hereby defined as the nozzle aspect ratio, may be varied from a square configuration to a long narrow rectangle.

BRIEF DESCRIPTION OF THE DRAWING

FIG. 1 is a view illustrating a location of a two-dimensional nozzle on a turbojet engine.

FIG. 2 is an enlarged schematic view showing two positions of the flaps and two positions of the plug.

DESCRIPTION OF THE PREFERRED EMBODIMENT

Figure 3:
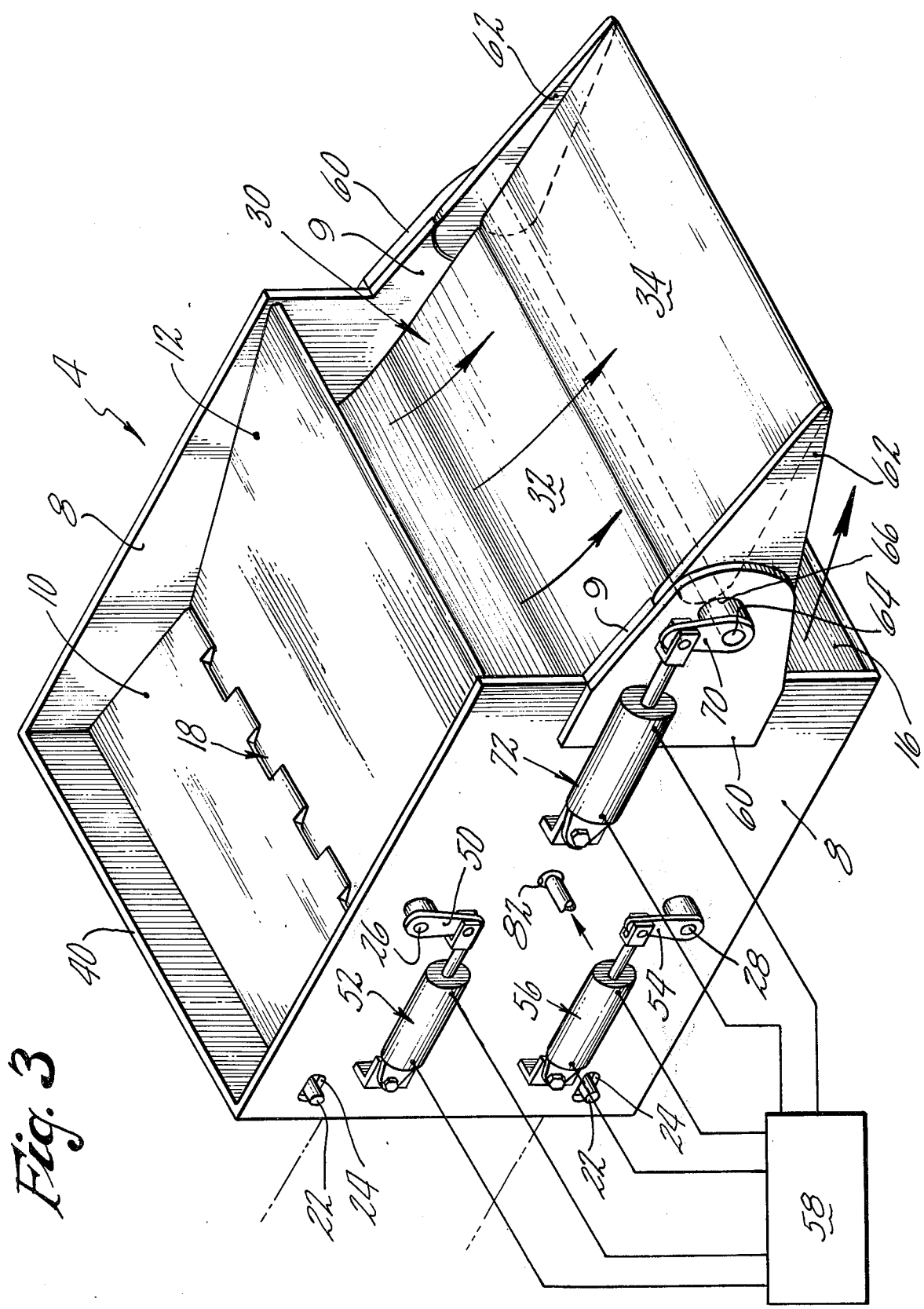
FIG. 3 is a perspective view of the two-dimensional nozzle showing it connected to an engine exhaust by a transition duct.

Referring to FIG. 1, the turbojet engine 2 shown includes a conventional compressor section, burner section and turbine section with an exhaust duct and two-dimensional nozzle 4. The engine 2 can include an afterburner or be another type of gas producer. The two-dimensional nozzle 4 has a rectangular cross section and is connected to the circular exhaust duct of the engine 2 by a transition section 6. The transition section 6 takes the flow from a circular cross section to a rectangular cross section while maintaining the flow area substantially the same.

The two-dimensional nozzle 4 comprises two side plates 8 extending rearwardly from the rear of the transition duct 6. A balanced flap system is positioned at the top and the bottom of the two-dimensional nozzle 4 with each system having two cooperating flaps 10 and 12, and 14 and 16, respectively. Each flap 12 and 16 is pivotally mounted between the side plates 8 on axes A and B, respectively. The forward end of flap 12 is pivotally mounted to the rearward end of flap 10 at 18 and the forward end of flap 16 is pivotally mounted to the rearward end of flap 14 at 20 in the same manner. The forward ends of the flaps 10 and 14 are mounted for guided longitudinal movement. This is shown in the figures by a short pin 22 extending from the forward end of each side of the flaps 10 and 14 with the short pins 22 being mounted in guide slots 24 located in the side plates 8. Each flap 12 and 16 is pivotally mounted between the side plates 8 in a similar manner on short pins 26 and 28, respectively, located on the axes A and B. Said pins 26 and 28 extend through holes in the side plates 8. As the flaps 12 and 16 pivot between their position of maximum exit area ($A_{E\,max}$) and minimum area ($A_{E\,min}$) the forward ends of the flaps 10 and 14 move along their guided longitudinal direction.

The side plates 8 are connected at the top and bottom of their forward ends by an upper plate 40 and a lower plate 42 forming an inlet opening 41. These upper and lower plates, 40 and 42, respectively, extend inwardly to a point located inside of the upper and lower guide slots 24, respectively. A short fairing 44 extends rearwardly from the inner end of the plate 40 to fair the opening 41 with the inner side of flap 10 and a short fairing 46 extends rearwardly from the inner end of the plate 42 to fair the opening 41 with the inner side of the flap 14.

A lever 50 extends from the end of pin 26 for rotating flap 12. A piston and cylinder unit 52 is connected between the side plate 8 and the free end of the lever 50 for moving said lever. A lever 54 extends from the end of pin 28 for rotating flap 16. A piston and cylinder unit 56 is connected between the side plate 8 and free end of the lever 54 for moving said lever. Said cylinder and piston unit 52 and 56 are connected to a control 58 for obtaining desired actuation of the flaps 10 and 12, and 14 and 16. This control may call for symmetric positioning of the flaps 10 and 12, and 14 and 16, respectively, or for differential movement.

The two-dimensional nozzle 4 further includes a plug 30 positioned between the flaps 12 and 16. The forward part 32 of the plug 30 is fixedly mounted between the side plates 8 while a rearward portion 34 is pivotally mounted to achieve vectoring. The side plates 8 have a short wall section 9 extending rearwardly from the center thereof to provide a side wall for the portion of the plug extending rearwardly of the end of the side plates 8.

Mounting brackets 60 are fixed to the short wall sections 9 of the side plates 8 and provide for the pivotal mounting of the rearward portion 34 of the plug 32. The rearward portion 34 includes side walls 62 which are fixed to the ends thereof and form a continuation of the side walls formed by the short wall section 9 of the side plates 8. The forward end of the rearward portion 34 has mounting pins 64 extending from each side wall 62 thereof which are positioned in holes 66 in the mounting brackets 60. The rearward end of the short wall sections 9 and the forward ends of the side walls 62 are formed of mating arcuate surfaces so that the side walls 62, fixed to the rearward portion 34, will rotate with the rearward portion 34 while maintaining a continuous wall surface with the short wall section 9.

A lever 70 extends from the end of the mounting pin 64 for rotating the rearward portion 34 of the plug 30. A piston and cylinder unit 72 is connected between the side plate 8 and the free end of the lever 70 for moving said lever. Said cylinder and piston unit 72 is connected to control 58 for obtaining desired actuation of the rearward portion 34 of the plug 32. It is to be understood that the control 58 can be programmed for moving the flaps 12 and 16 and rearward portion 34 of the plug 32 in accordance with a desired schedule or the flaps 12 and 16 and portion 34 can be controlled manually. An opening 80 is shown at the forward end of the plug 32 through which cooling fluid can be directed if necessary. An opening 82 is shown in a side plate 8 to mate with the opening 80.

The plug 30 is contoured symmetrically tapering outwardly to a line C located downstream of the pivot axis A of flap 12 and pivot axis B of flap 16. This provides for an increase in area ratio $A_E/A_J$ as throat area $A_J$ increases. The contour of the plug 30 rearwardly from line C tapers inwardly maintaining the throat between the flaps 12 and 16 and line C between the maximum area opening of the nozzle and the minimum area opening, rather than shifting the throat to another location such as to the rear of the flaps. It can be seen that the flap systems can be rotated until flap 12 touches one side of the plug 30 and flap 16 touches the other side of the plug 30. This additional movement of the flaps 12 and 16 beyond the operating positions providing for $A_{E min}$ and $A_{E max}$ provides a flow blockage if desired.

Figure 4:
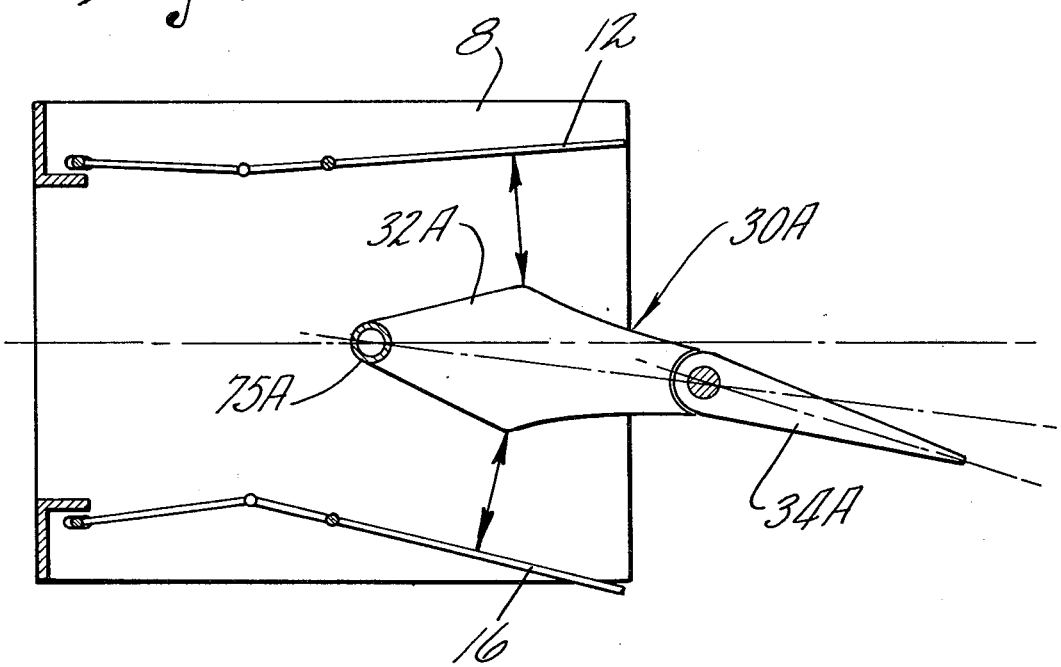
FIG. 4 is a schematic view of the two-dimensional nozzle showing a modified plug.

FIG. 4 discloses a modification wherein the forward part 32A of the plug 30A is movable along with the rearward portion 34A. The controls for the rearward portion 34 can be located within the forward part with the control means extending out of hollow mounting pins 75A. The forward part of the plug 30A can be pivotally mounted on the hollow mounting pins 75A. FIG. 4 shows the flap 12 and 16 positioned forming equal throat areas with the contour of the forward part 32A of the plug 30A as the forward part 32A is rotated.

Figure 5:
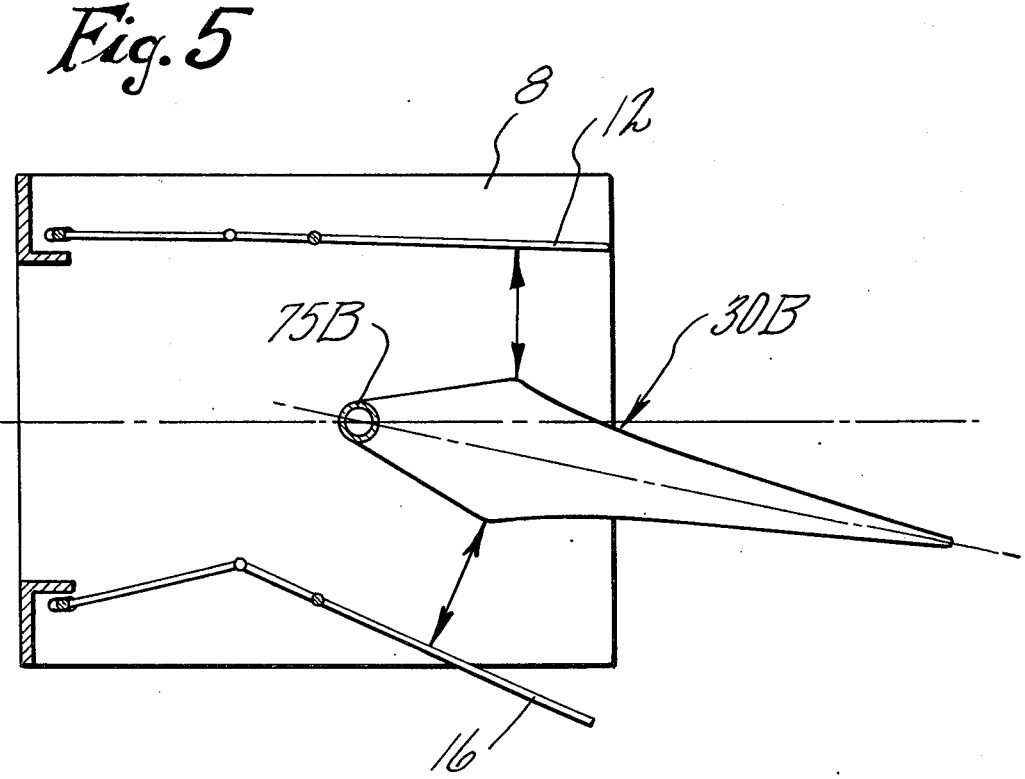
FIG. 5 is a schematic view of the two-dimensional nozzle showing another modified plug.

FIG. 5 discloses a modification wherein the plug 30B is formed of one piece which is pivotally mounted at its forward end around hollow mounting pins 75B. Here again, the flaps 12 and 16 are shown positioned to give an equal throat area between the two flaps 12 and 16 and the plug 30B as the plug 30B is rotated.

I claim:

1. A flap-type two-dimensional plug nozzle having a rectangular inlet, fixed sides extending rearwardly from each side of said inlet, a pivotally mounted top flap, said pivotally mounted top flap being pivotally mounted between its ends about a first fixed pivotal axis extending between said fixed sides, a pivotally mounted bottom flap, said pivotally mounted bottom flap being pivotally mounted between its ends about a second fixed pivotal axis extending between said fixed sides, the rear ends of said top and bottom flaps along with said fixed sides forming the exit area, plug means centered between said pivotally mounted top flap and said pivotally mounted bottom flap, a first throat plane being formed between said plug means and said top flap, a second throat plane being formed between said plug means and said bottom flap, said top flap forming a convergent-divergent passage with said plug means, said bottom flap forming a convergent-divergent passage with said plug means, said first and second throat planes being located downstream of said first and second pivotal axes, respectively, to provide an increase in nozzle area ratio as throat area at the throat plane increases.

2. A nozzle as set forth in claim 1 wherein the rear part of the plug means is pivoted to deflect the exhaust gases away from the nozzle centerline.

3. A nozzle as set forth in claim 1 wherein a balance flap is hinged to each flap upstream of the flap pivot to offset pressure forces on the portion of the flap downstream of its pivot, thereby minimizing the actuation force required to move the flap system to control throat area.

4. A nozzle as set forth in claim 1 wherein the plug means is pivoted about its upstream end to deflect the exhaust gases away from the nozzle centerline.

5. A two dimensional plug nozzle as in claim 1 wherein the flaps can be rotated past their normal minimum throat area position such that the downstream ends of said flaps come in contact with the plug means thereby blocking flow through the nozzle.

6. A nozzle as set forth in claim 1 wherein side walls extend from the ends of said fixed sides along each end of the plug means to channel flow thereover.

7. A nozzle as set forth in claim 6 wherein the rear part of the plug means is pivoted to deflect the exhaust gases away from the nozzle centerline, the side walls on the rear part of the plug means being pivoted to move therewith.

8. A nozzle as set forth in claim 3 wherein said rectangular inlet has a short upper wall member extending rearwardly from the top thereof and a short lower wall extending rearwardly from the bottom thereof, the forward end of the balance flap hinged to the top flap is slideably mounted adjacent the short upper wall member, the forward end of the balance flap hinged to the bottom flap is slideably mounted adjacent the short lower wall member.

9. A flap-type two-dimensional plug nozzle having a rectangular inlet, fixed sides extending rearwardly from each side of said inlet, a pivotally mounted single top flap, said top flap having a continuous inner surface, said top flap being pivotally mounted between its ends about a first fixed pivotal axis extending between said fixed sides, a pivotally mounted bottom flap, said bottom flap having a continuous solid inner surface, said flap being pivotally mounted between its ends about a second fixed pivotal axis extending between said fixed sides, the rear ends of said top and bottom flaps along with said fixed sides forming the exit area, plug means centered between said inner surface of said top flap and said inner surface of said bottom flap, a first throat plane being formed between said plug means and the surface of said top flap, a second throat plane being formed between said plug means and the surface of said bottom flap, the surface of said top flap forming a convergent-divergent passage with said plug means, the surface of said bottom flap forming a convergent-divergent passage with said plug means, said first and second throat planes being located downstream of said first and second pivotal axes.

* * * * *